May 2, 1961  R. L. WHEARLEY  2,982,888
SLEEVE TYPE ENCAPSULATED ELECTRICAL COMPONENT
Filed May 23, 1957  3 Sheets-Sheet 1

INVENTOR.
ROBERT L. WHEARLEY
BY
ATTORNEYS

May 2, 1961   R. L. WHEARLEY   2,982,888
SLEEVE TYPE ENCAPSULATED ELECTRICAL COMPONENT
Filed May 23, 1957   3 Sheets-Sheet 2

*INVENTOR.*
ROBERT L. WHEARLEY
BY Toulmin & Toulmin
ATTORNEYS

May 2, 1961 R. L. WHEARLEY 2,982,888
SLEEVE TYPE ENCAPSULATED ELECTRICAL COMPONENT
Filed May 23, 1957 3 Sheets-Sheet 3
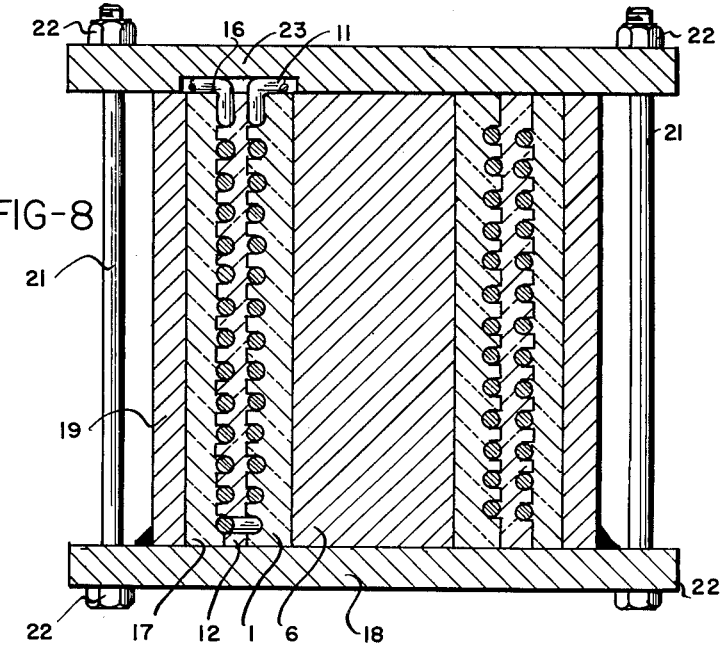
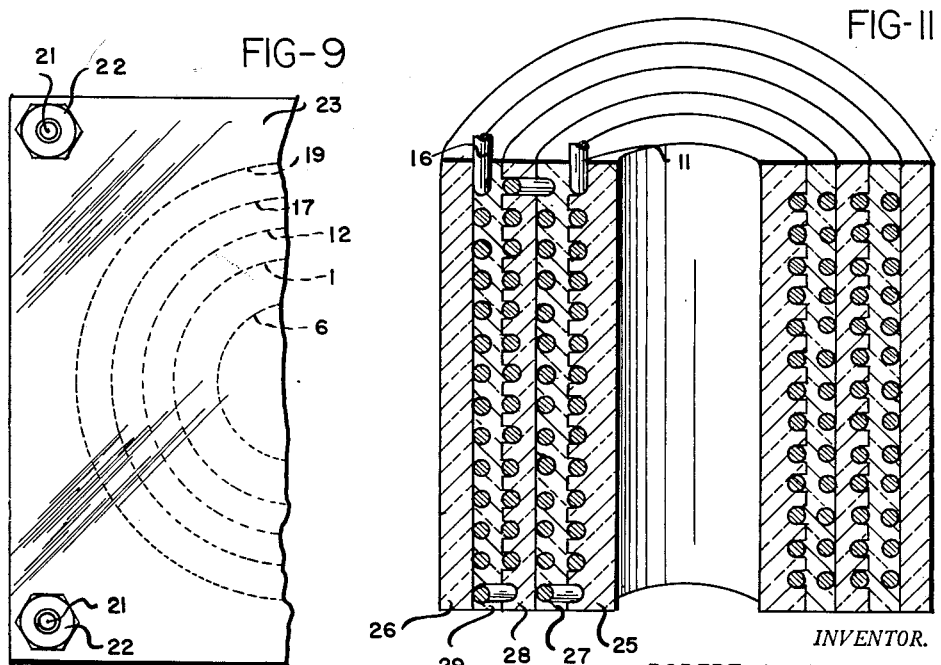
INVENTOR.
ROBERT L. WHEARLEY
BY
ATTORNEYS United States Patent Office 2,982,888
Patented May 2, 1961

2,982,888

SLEEVE TYPE ENCAPSULATED ELECTRICAL COMPONENT

Robert L. Whearley, Fort Wayne, Ind., assignor, by mesne assignments, to Rea Magnet Wire Company, Inc., Fort Wayne, Ind., a corporation of Delaware Filed May 23, 1957, Ser. No. 661,169

5 Claims. (Cl. 317—158)

This invention relates to encapsulated electrical components and to methods of manufacture thereof.

It is of importance with many electrical devices such as solenoids, resistors and armature-receiving coils that the wire component be sealed both in order that constant electrical values may be maintained and the device be protected against the actions of moisture, vapors, and heat, for example.

A primary object of this invention is to provide improved encapsulated components in which the encapsulating material may be either organic or inorganic.

A principal object of this invention is to provide novel methods of constructing encapsulated electrical components which methods permit the usage of either inorganic or organic insulating materials.

A particular feature of the invention resides in the provision of encapsulated electrical components which are resistant to high temperatures, that is 400°–500° C. This is accomplished in the practice of the invention by utilizing inorganic electrical insulating materials of relatively high softening point.

A further feature of the invention resides in a novel sleeve arrangement of wire windings on electrical insulating material, the windings being enclosed, sealed and rigidly held by the insulating material.

In the preferred embodiment of the invention the encapsulated component is produced by winding wire into grooves of a sleeve, for example, the sleeve being constituted of electrical insulating material; over the first wound sleeve is placed a second sleeve in concentric relationship with the first, and this second sleeve is likewise wound with wire to thus form a pair of windings in spaced insulated relation. The windings are so formed as to be connected in electrical series, and the turns of the wire are insulated from each other. As many such windings as is desired may be formed on concentrically disposed sleeves and thereafter the assembly operation is completed by the provision of a covering sleeve of ungrooved insulating material. The assembly is then supported in a mold body and heated sufficiently to cause the insulating material to assume a viscous, flowable state and the insulating material encloses and securely fixes the windings while sealing the assembly. Cooling and removal from the mold body provides a completed encapsulated unit.

The procedure lends itself to mass production methods both in assembly and sealing as will be noted from the detailed description set out hereinafter.

The invention will be more fully understood by reference to the following detailed description and accompanying drawings wherein:

Fig. 8 illustrates the structure of Fig. 7 within a mold body;

Fig. 9 is a fragmentary view of the structure of Fig. 8 illustrating a mold end plate arrangement;

Fig. 11 is a view partially in section of a further embodiment of the structure of invention.

In the practice of the invention the insulating material which supports and spaces the windings may as already noted be inorganic or organic. Thus siliceous materials such as glass and polymerizable plastics are employable. The invention will be described in specific relation to siliceous materials however as such afford a generally higher and desirable heat resistance.

Figure 1:
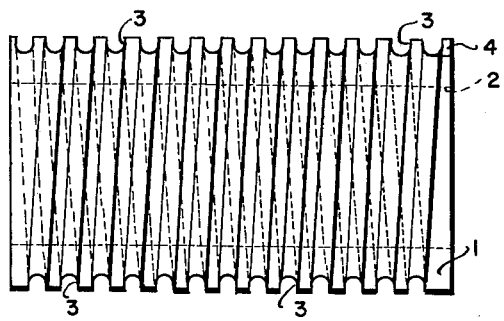
Fig. 1 is a view of a coil form used in the practice of the invention.
Figure 2:
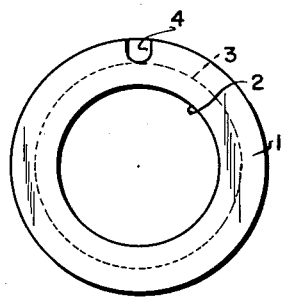
Fig. 2 is an end view of the form of Fig. 1.
Figure 3:
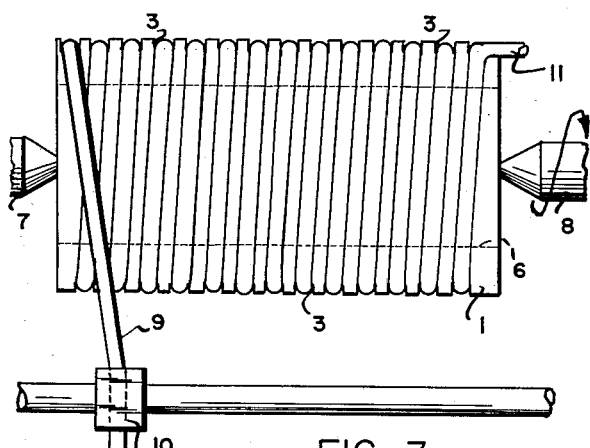
Fig. 3 is a view illustrating the form of Figs. 1 and 2 supported for rotation and with a winding of wire thereon.

Referring to the drawing the numeral 1 designates a sleeve of glass having an axial bore 2, and grooves 3 forming a spiral over the sleeve length. Rightwardly (Fig. 1) the sleeve has an axial extending passage 4. As shown in Fig. 3 the bore 2 receives a removable core 6 preferably of a metal of high melting point—and the sleeve is supported thereby for rotation on shafts 7, 8 which may respectively be associated with ahead-stock and tail-stock of a lathe, for example.

Figure 4:
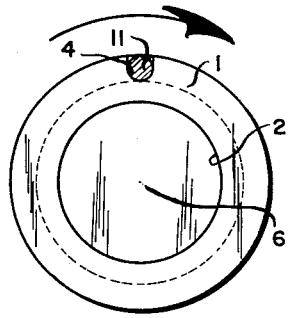
Fig. 4 is an end view of the wound coil form of Fig. 3.

Electrically conductive wire 9 is drawn from a suitable source (not shown) and applied by traverse mechanism indicated generally at 10 to the sleeve 1 as shown (Figs. 3 and 4). The first end of the wire indicated at 11 extends through passage 4 and serves as a holding means in the winding operation; also wire end 11 functions as a lead in the end product. The grooves and wire diameter are so related that the wire lies in the grooves and does not protrude above the sleeve surface.

Figure 5:
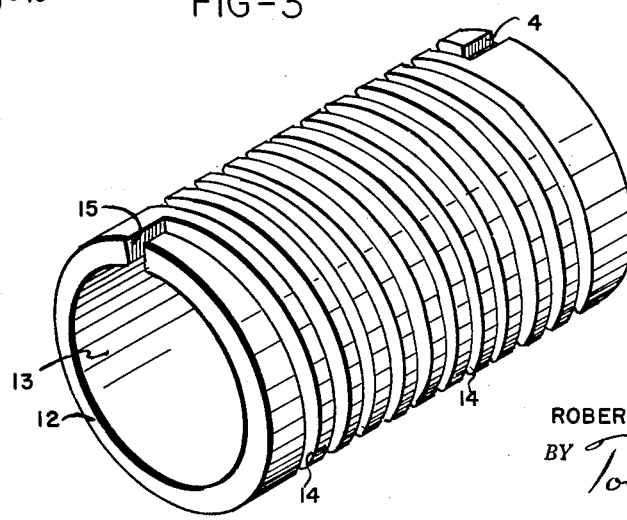
Fig. 5 is a perspective view of a sleeve or second coil form which is adapted to be slid over the wound coil form of Fig. 3.

Each sleeve of the component may be wound separately and the windings then connected in series electrically by splicing the wires. However with the arrangement shown in Figs. 3, 4 and 5 continuous winding may be effected. As shown in Fig. 5 sleeve 11 has an axial bore 13, grooves 14 and is slotted through longitudinally at 15. Sleeve 12 as shown in the illustration also has a passage corresponding to the passage 4 of sleeve 1; where however more than 2 sleeves are employed the passages would normally appear only in the sleeve supporting the inner and outer windings and the remaining sleeves would be slotted through at both ends as at 15. Slot 15 is for the purpose of passing the wire continuously from the lower sleeve to the upper for winding formation on the upper sleeve.

Figure 6:
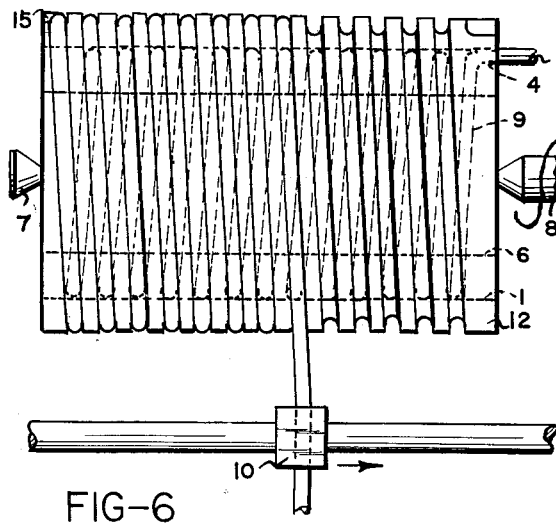
Fig. 6 illustrates the coil form of Fig. 5 in position and being wound.

The shaft 7 may be driven in either direction of rotation and accordingly the wire passing through slot 15 may be spiraled on the outer sleeve in a direction of the coil turns such that the turns are directly over those of the first sleeve or such that the turns are in an opposite direction to those of the first sleeve. By bringing wire 9 through slot 15 and maintaining the same direction of sleeve rotation as with the first sleeve the windings are in criss-cross relation on the two sleeves. With most wires the flexibility is such that the wire conforms readily to the sleeve contour; however if desired a drop of glaze on the wire at slot 15 will hold the wire appropriately positioned for winding in the left to right direction (Fig. 6).

Alternatively, to secure a desired winding arrangement for a particular application the wound sleeve may be demounted and turned end to end before receiving the second sleeve which latter sleeve may have a sufficient length of axial slot as 15 to conveniently receive the wire and to pass the wound first sleeve.

Figure 7:
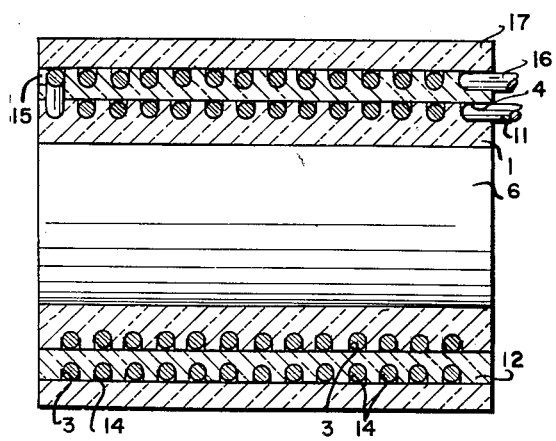
Fig. 7 illustrates an electrical component wound and ready to be placed in a mold body.

The second sleeve 12 fits the first sleeve closely and may itself receive other wound sleeves thereon. As shown in Fig. 7 however sleeve 12 receives a sleeve 17 of glass having no grooves and this sleeve serves as a covering sleeve.

The assembly of Fig. 7 including the metal core 6 as shown in Fig. 8 is slid into a mold body which comprises end plate 18; a tube 19 welded to plate 18 and adapted to receive the assembly in sliding engagement as shown; end plate 23; and threaded rods 21 which pass through the end plates and receive nuts 22 to securely retain the assembly on the mold body between the plates. Suitably end plate 23 is recessed at 23' to receive the wire ends or the ends may be passed out through plate 23.

The assembly, confined within the mold, is then placed within an oven and heated to a temperature sufficient to render the siliceous material or glass material of the sleeves at least viscous enough to flow about the conductor wires. Suitably for mass production a tunnel is provided and the assemblies within the mold bodies are passed through the tunnel on a conveyor.

Figure 10:
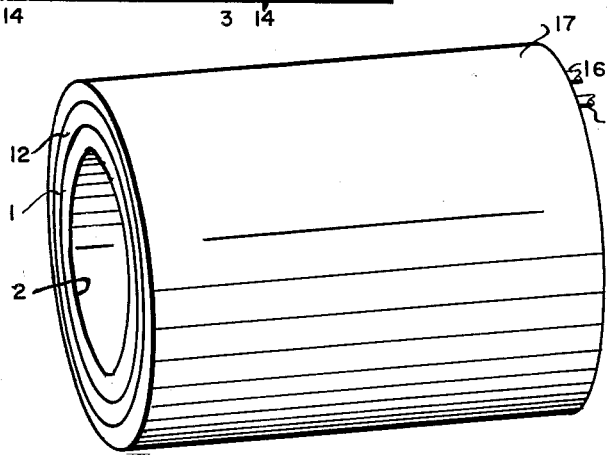
Fig. 10 is a perspective view of an encapsulated component.

Upon removal from the heat the assembly is cooled to about room temperature the mold removed and the core 6 taken from the assembly. The product will then appear as generally designated at 24 in Fig. 10 and is a compact arrangement of windings in sleeved relationship insulated by the siliceous material peripherally and endwise but connected together in electrical series.

Glasses suitable for the product of invention may have softening points as low as 900° F. and preferably have thermal coefficients of expansion closely approaching that of the electrically conductive wire. Siliceous materials embodying relatively high percentages of lead oxide, boric oxide and alumina are useful as low softening point glasses; appropriate proportioning of such materials permits the attainment of substantially any desired thermal coefficient of expansion.

Borosilicates are also suitable, particularly the soft borosilicates having softening points of 1600° F.–1800° F.; the silica-lime-alumina system glasses may also be employed.

It is not necessary that a single electrically insulating material be employed. For example a low softening point glass may be utilized for an intermediate sleeve as 12 in Fig. 8. The temperature then need only be raised to the softening point of this material to secure a complete seal for sleeve 12 when it becomes viscous will adhere to the wire of the windings and the solid sleeves 1 and 17. Care should be taken to inhibit flow to the recess 23 and for this reason it is desirable to heat the assembly with plate 23 uppermost. Any glass adhering to leads 11, 16 may be readily scraped therefrom. A combination of lead glass and a soft borosilicate or a hard borosilicate may be thus employed, the borosilicates forming the inner and outer sleeves. Also other high softening point electrical insulating materials, the ceramics for example, may be employed in such a composite.

An embodiment having a greater plurality of concentric windings is shown in Fig. 11. The product is constructed as described hereinbefore but comprises a winding on inner sleeve 25 of high softening point glass, an outer sleeve 26 also of relatively high softening point glass, and intermediate sleeves 27, 28, 29 each having windings thereon. Suitably sleeve 28 is also of high softening point glass while the sleeves 27, 29 are of low softening point material. Raising the temperature to an extent sufficient—that is 900° F. to 1300° F. to soften the material of sleeves 27, 29 is effective to enclose and seal the windings. Under this condition the high softening point materials such as the borosilicates remain solid during the heating and the turns of wire remain securely fixed during the heating.

Leads 16, 11 of the structure of Fig. 11 extend from one end only of the component since the device is wound as described in connection with Fig. 3 and has an even number of windings.

Figure 12:
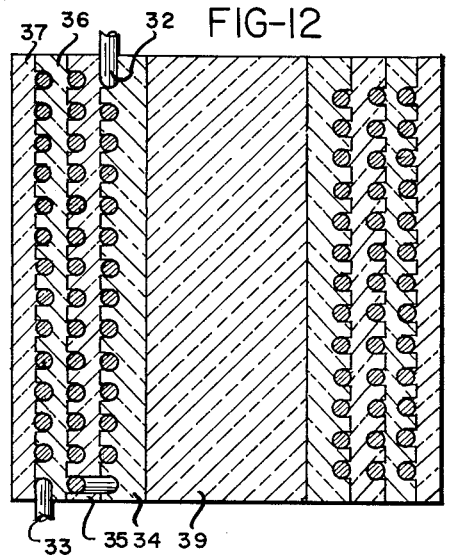
Fig. 12 is a sectional view of yet another embodiment of the invention.

In the embodiment of Fig. 12 the windings are an odd number and the leads 32, 33 extend from opposite ends. The sleeves with the windings thereon are designated by the numerals 34, 35, 36 and the outer sleeve is indicated at 37. The sleeves may be all of one softening point or the intermediate sleeve 35 may be of a different softening point than the bounding sleeves 34, 37. In this instance the component has a solid core of insulating material 39 and is suitable as a resistor. The glass 39 may be integral with the glass 34; or the glass 39 may be a low fusion point material deposited in the core hole after complete formation of the component and fused in place.

As already noted it is preferable that the encasing insulating material and the wire of the windings have approximately the same coefficients of thermal expansion. Such is desirable where the windings are to be operated under high temperature conditions in order to avoid strains in the encasing material. Suitable materials for the wire include copper, steel, nickel, silver, aluminum, aluminum coated silver, and copper coated alloys such as the nickel-iron alloys; a nickel-iron alloy containing about 48% by weight of nickel and 52% by weight of iron, copper clad if so desired is useful. No insulation coating is required on the wire itself in the practice of the invention; bare wire is employed but insulation may be employed as a coating where temperature and operating conditions permit.

The wire diameters useful range from the very fine to the large sizes of magnet wire for example from #50 American wire gauge (about .001") to #10 (about 0.1"). The bare wire may be wound as closely as the spacing of the grooves permit. While for the sake of clarity in the drawings the turns and number of windings have been limited it will be appreciated that the number of windings may be materially increased and the sleeved relationship of the windings to each other may be as close as the dielectric quality of the insulating material will allow without breakdown.

While power winding of the wire is desirable with all sizes of wire and the core 6 may be provided in a conventional manner on a shaft driven from the headstock of a lathe as indicated in Fig. 3, hand winding may be readily accomplished.

Organic materials useful as the insulation include the resins particularly those which soften in heat and resolidify, for example, the styrenes, methyl methacrylates and vinyl acetates. In general the resins are utilizable where the final product is not subjected to excessive temperature conditions.

This application is related to:

Serial No. 657,893, Robert L. Whearley, Evert A. Mol; filed May 8, 1957; title, Insulated Wire Particularly for Coils and the Manufacture Thereof.

Serial No. 661,170, Robert L. Whearley, filed May 23, 1957; title, Insulated Winding and Process of Manufacture Thereof.

Serial No. 699,965, Robert L. Whearley, Leo J. Novak, Fritz O. Deutscher; filed December 2, 1957; title, Insulated Electrical Equipment and Process of Making.

Serial No. 700,044, Robert L. Whearley, Hermann C. N. Heckel; filed December 2, 1957; title, Heat Resistant Insulated Electrical Components and Process of Making.

Serial No. 700,173, Robert L. Whearley, Hermann C. N. Heckel; filed December 2, 1957; title, Electrical Components Insulated with Glass and Process of Making; all assigned to the same assignee as the present invention.

It will be understood that this invention is susceptible to modification in order to adapt it to different usages and conditions and accordingly, it is desired to comprehend such modifications within this invention as may fall within the scope of the appended claims.

I claim:

1. An encapsulated electrical component comprising sleeves of electrically insulating material in concentric sealed relationship, and windings comprised of spaced turns of electrically conductive wire on the sleeves substantially wholly within grooves of the sleeves, connected in series electrically and sealed and enclosed by the insulating material.

2. An encapsulated electrical component comprising an inner sleeve of electrical insulating material having a groove spiraled over the length thereof, an outer sleeve of electrical insulating material also having a groove spiraled over the length thereof, said latter sleeve having a notch adjacent one end thereof, the said sleeves being sealed together, an electrically conductive bare wire extending continuously from one end of the inner sleeve substantially wholly in the grooves thereof through the notch in the outer sleeve and substantially wholly in the grooves of the second sleeve to the second end thereof, and an outer sleeve of insulating material sealed to and enclosing the other sleeves and the wire of the component, said wire being sealed peripherally and endwise.

3. An encapsulated electrical component comprising an inner sleeve and an outer sleeve of relatively high softening point electrically insulating material, an intermediate sleeve sealed to and positioned between the inner and outer sleeves, said inner sleeve and said intermediate sleeve having windings thereon comprised of spaced turns of bare electrically conductive wire, the winding being connected in electrical series and sealed within grooves of the insulating material of the sleeves, said wire being sealed peripherally and endwise.

4. An encapsulated electrical component comprising windings formed of spaced turns of electrically conductive bare wire, the windings being in sleeved relationship and in series electrically, and concentric sleeves of electrical insulating material sealed together insulating, supporting and enclosing the windings substantially wholly within grooves of the sleeves, the inner and outer sleeves of the component being of relatively high softening point material and intermediate sleeves being alternately of relatively low softening point and relatively high softening point electrically insulating material.

5. An encapsulated electrical coil comprising an inner sleeve of electrical insulating material, an outer sleeve of electrical insulating material, an intermediate sleeve of electrical insulating material, said sleeves being in concentric relationship and each having a groove spiraled over its length, said inner and outer sleeves having axially extending notch means and said notches extending axially from the respective sleeve ends to the spiral groove of the respective said sleeve, said inner and intermediate sleeves having communicating slots inwardly of the sleeve ends and opposite the end of the inner sleeve having said notch, a wire extending from the notch of said inner sleeve continuously through the said slots and wholly within the said grooves to the said notch of said outer sleeve, said wire being enclosed fully within said spiral grooves, and said intermediate sleeve having a lower softening point than the inner and outer sleeves and being sealed to said inner and outer sleeves and sealing said wire in said grooves to said inner sleeve and said intermediate sleeve.

References Cited in the file of this patent

UNITED STATES PATENTS

| | | |
|---|---|---|
| 677,862 | Dwyer | July 9, 1901 |
| 812,657 | Kitsee | Feb. 13, 1906 |
| 1,661,953 | McIntosh | Mar. 6, 1928 |
| 2,348,055 | Chapman | May 2, 1944 |
| 2,506,026 | Kifer et al. | May 2, 1950 |
| 2,583,854 | Kehbel | Jan. 29, 1952 |
| 2,654,861 | Khouri | Oct. 6, 1953 |
| 2,707,693 | Dorst | May 3, 1955 |
| 2,728,879 | Erikson | Dec. 27, 1955 |
| 2,739,371 | Grisdale et al. | Mar. 27, 1956 |
| 2,807,869 | Rice | Oct. 1, 1957 |